Aug. 21, 1962     C. A. RASSIER     3,050,302
TOYS

Filed Dec. 9, 1958                                        4 Sheets-Sheet 1

INVENTOR
Cecil Arthur Rassier
BY
Johnson and Kline
ATTORNEYS

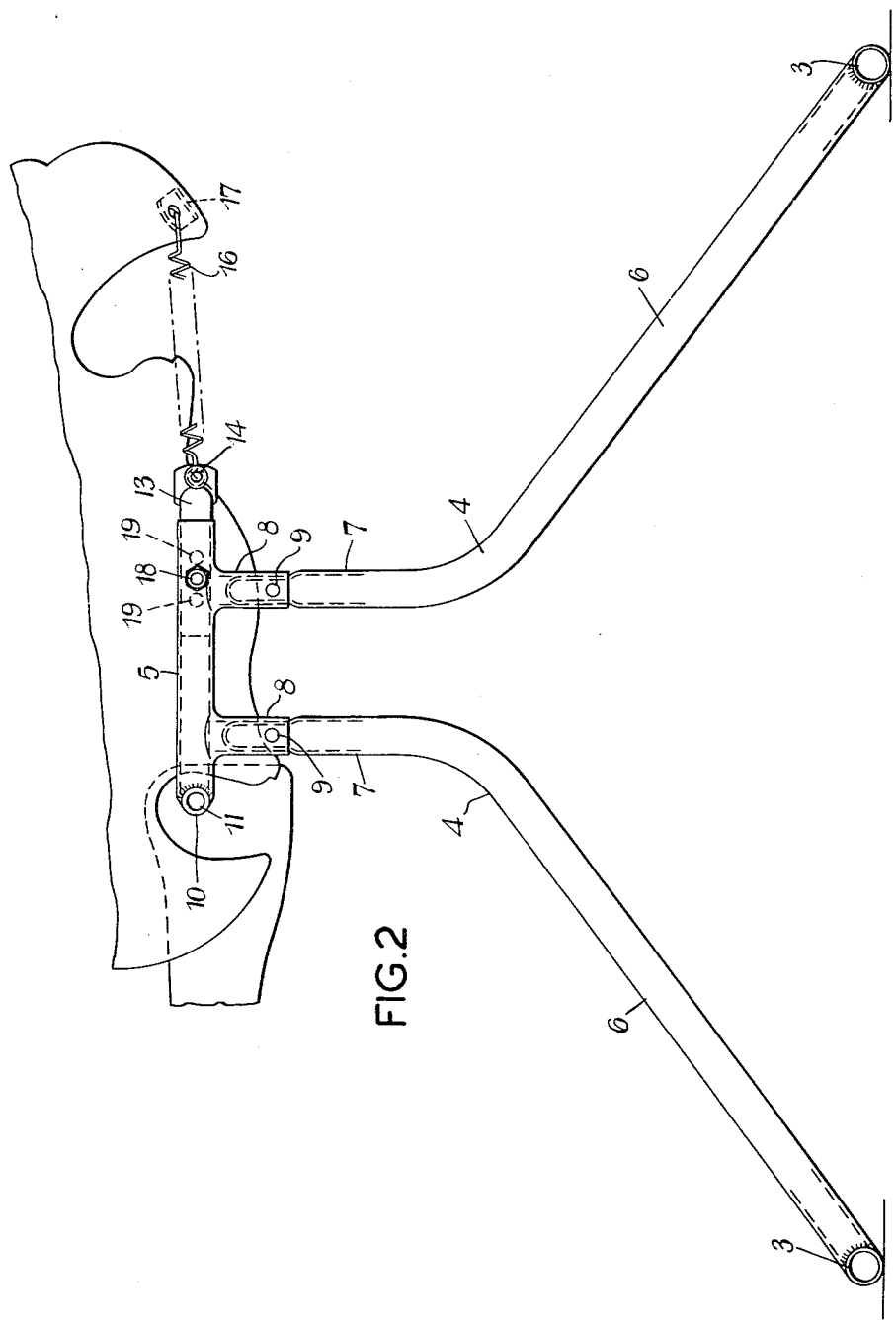

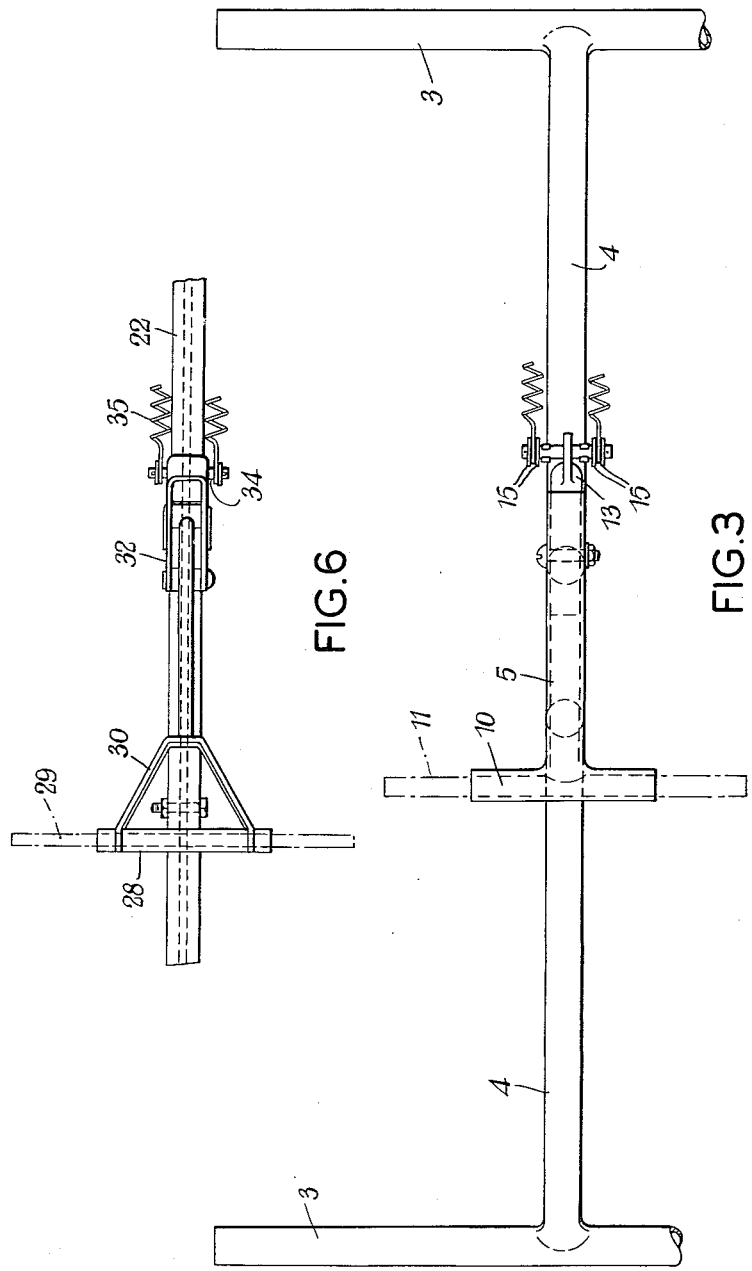

Aug. 21, 1962  C. A. RASSIER  3,050,302
TOYS

Filed Dec. 9, 1958  4 Sheets-Sheet 4

INVENTOR
Cecil Arthur Rassier
BY
Johnson and Kline
ATTORNEYS

United States Patent Office 3,050,302
Patented Aug. 21, 1962

3,050,302
TOYS
Cecil Arthur Rassier, Erith, England, assignor to D. Sebel & Company Limited, Erith, Kent, England, a British company
Filed Dec. 9, 1958, Ser. No. 779,111
Claims priority, application Great Britain Dec. 21, 1957
10 Claims. (Cl. 272—52)

The present invention relates to the type of toy upon which a child sits, the weight being taken by springs, and in its known form comprises a representation of a horse mounted upon springs extending from about the top of each leg of the horse to external stationary supports. The toy is operated by the child bouncing upon the horse and rocking it and takes the place of the more orthodox form of rocking horse.

The present invention relates to a toy of this type and comprises a stand, a body support for the child pivoted to the stand so that the support rotates about a substantially horizontal axis and spring means connecting the support to the stand so as to allow the support to rock about its pivot as the child bounces or otherwise moves up and down upon the body support.

According to a further feature of the invention a means is provided for varying the resistance of the spring means to the aforesaid rocking of the support, the said varying means comprising, in the case of tension springs, a means for varying the tension of the springs; or in the case of compression springs, a means for varying the compression of the springs.

Embodiments of the invention will now be described with reference to the accompanying drawings in which:

FIGURE 2 is an elevation drawn to an enlarged scale, of the stand of the horse of FIGURE 1;

FIGURE 3 is a plan view of the stand of FIGURE 2;

FIGURE 6 is a partial plan view of the stand of FIGURE 5.

Figure 1:
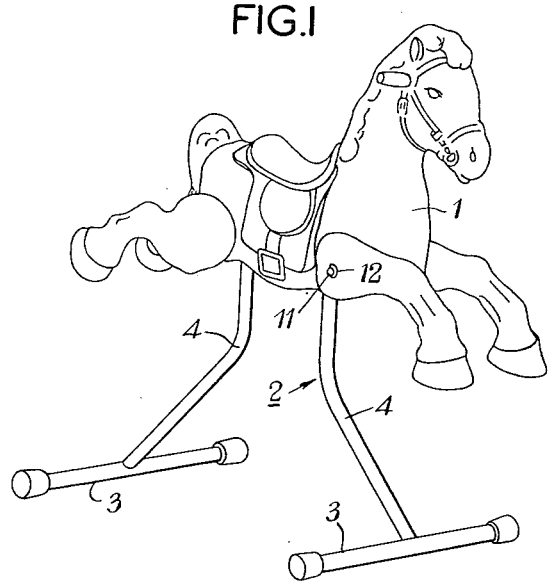
FIGURE 1 is a perspective view of a rocking horse embodying the invention.

Referring firstly to FIGURES 1 to 3, the horse shown therein comprises a body 1 formed in known manner from a pair of metal pressings each representing one side of the horse and connected together to form a hollow interior having an opening (not shown) extending longitudinally of the underside of the horse and through which the upper end of a stand indicated generally at 2 extends to support the horse in a manner hereinafter described.

The stand 2 comprises a pair of laterally extending floor engaging members 3 to each of which there is secured as by welding and midway of its length, an upwardly extending frame member 4, the upper ends of the frame members 4 being connected to a frame member 5 extending longitudinally of the horse within the body thereof. The frame members 4 incline towards each other at their lower end portions 6 while the upper end portions 7 of the frame members 4 extend substantially vertically to be removably received in short tubular members 8 secured to and extending downwardly from the longitudinal frame member 5. In this manner the longitudinal frame member 5 is readily detachable from the frame members 4 and is detachably secured thereto by screws and nuts (not shown) inserted through holes 9 in the tubular members 8 and registering holes in the upper ends of the frame members 4.

The front end of the longitudinally extending frame member 5 has secured thereto a transversely extending tubular member 10 which serves as a bearing for a pivot rod 11 extending therethrough and upon which the front of the body of the horse is pivoted, the ends of the pivot rod 11 extending through apertures in the sides of the horse to receive nuts 12 for securing the horse body thereto. The tubular member in addition acts as a spacer member and is made of a length such that it engages the inner surface of the body to locate the body longitudinally centrally with respect to the stand 2.

The longitudinal frame member 5 is in the form of a tube and is open at its rear end to receive a short tubular shank 13 to the rear end of which there is secured a short laterally extending rod 14 each end of which carries a pair of washers 15 between which one end of a helical tension spring 16 is secured on to the rod 14. The other end of the spring 16 is secured to a bracket 17 fixed to the corresponding side of the body 1.

The shank 13 is secured in the longitudinal frame member 5 by a screw and nut inserted through a hole 18 in the frame member 5 and a selected one of holes 19 in the shank 13. The holes 19 are spaced lengthwise of the shank 13 so that by registering a selected hole 19 with the hole 18, the amount by which the shank 13 extends from the rear end of the frame member 5 can be adjusted thereby to adjust the tension of the springs 16.

It will be apparent from the construction described that the body 1 is pivotally supported at its front on the stand 2 by means of the pivot rod 11 and the rear of the body is supported on the stand by the springs 16 which allow the body to rock about its pivot as the rider bounces or otherwise moves up and down on the body. The length of the springs 16 is preferably made such that they are under tension when secured in position i.e. with the body unloaded, the tension of the springs being such that the body is supported in a substantially horizontal position when a child is seated thereon.

In order to achieve a maximum safety factor, the floor engaging members 3 extend on each side of the horse beyond the greatest width of the body 1 or the width taken up by a rider seated on the body. In addition the frame members 4 are shaped so that the floor engaging members 3 lie well forwardly and rearwardly respectively of the pivot rod 11 and the brackets 17 to which the rear ends of the springs 16 are secured.

When it is desired to disassemble the horse for storage or for packing, it is only necessary to remove the screws securing the upper ends of the frame members 4 in the tubular members 8 to permit the members 4 to be removed, the horse then being in three parts viz: the body of the horse and two stand portions each comprising a frame member 4 and a floor engaging member 3.

Figure 4:
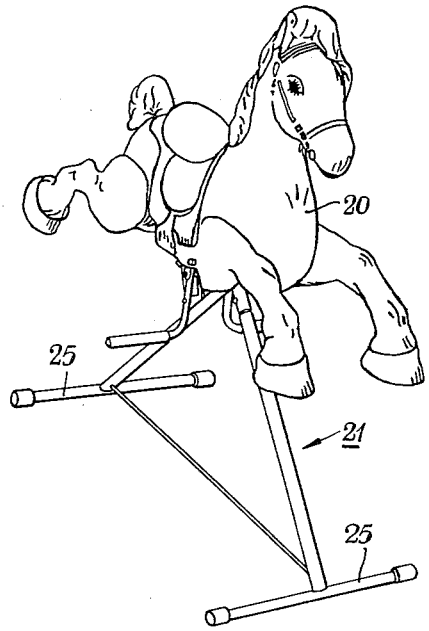
FIGURE 4 is a perspective view of an alternative construction of rocking horse according to the invention.
Figure 5:
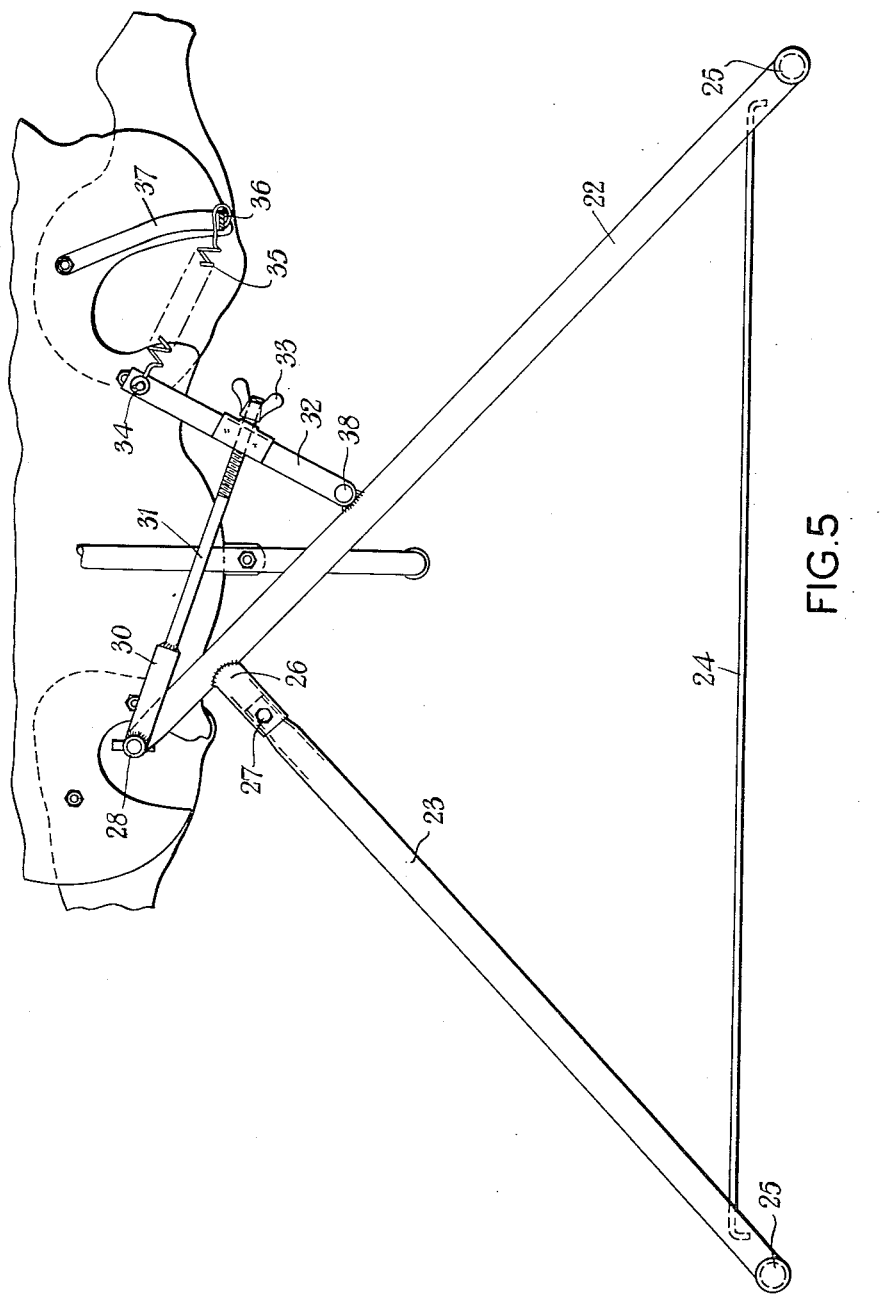
FIGURE 5 is an elevation drawn to an enlarged scale of the stand of the horse of FIGURE 4.

Referring now to FIGURES 4 to 6 there is shown an alternative construction of rocking horse embodying the invention. The horse of FIGURES 4 to 6 comprises a body 20 formed in a manner similar to the body 1 of FIGURES 1 to 3 and mounted on a stand 21 which extends upwardly into the body 20. The stand 21 is triangular and is formed by two inclined leg members 22 and 23 formed from tubular steel with a third member 24 comprising a tie rod connecting the two legs 22 and 23 at their lower end. Each of the legs 22 and 23 has secured thereto a laterally extending floor engaging member 25.

Conveniently for breakdown of the horse into a substantially flat package the leg 23 is demountable from the leg 22 the upper end of the leg 23 fitting into a socket 26 provided at the upper end of the leg 22 and being retained therein by means of a nut and bolt 27.

The upper end of leg 22 carries a transverse tubular member 28, in which is journalled a pivot rod 29 to which the body of the horse is pivoted on either side as in the construction of FIGURES 1 to 3. Centrally mounted upon the transverse member 28 is a U member 30 which carries at its rear end a threaded rod 31 which engages in a bifurcated pivoted arm 32 in such a manner that by adjusting a wing nut 33 on the screw threaded rod 31 the arm can be moved along the rod 31.

The arm 32 is pivoted to the leg 22 at its upper portion as at 38 and at its upper end carries a short transversely extending pin 34. Each end of the pin 34 serves as the forward anchor for a pair of tension springs 35 the rear ends of which are secured to the rear end of the body 20 by means of a cross member 36 which spans the body and is reinforced by a tubular bracing member 37.

It will be apparent that by tightening the wing nut 33 the arm 32 will be moved forwardly and the tension springs 35 stretched so as to accommodate a greater weight on the horse and also to give a greater rocking or bouncing effect.

It will be understood that the invention is not limited to the above described embodiments and for example the body need not represent a horse but can take any other desired form. Furthermore the supporting stand may be of other forms and the pivotal connection of the body to the stand and the connection of the springs thereto can be reversed so that the pivotal connection is at the rear of the body and the springs serve to support the front of the body.

What I claim is:

1. A toy of the type which is rocked by a child supported thereon, comprising an upwardly extending stand, floor-engaging members at the lower end of the stand, a body including child-supporting means positioned centrally lengthwise of the body, means pivotally supporting the body on the stand at its upper end for rocking about a substantially horizontal axis, said pivotal supporting means engaging the body at a point displaced longitudinally in one direction from the centre of the body and adjacent one end of said child-supporting means and spring means connecting the stand at its upper end to the body at a point displaced longitudinally in the other direction from the centre of the body and adjacent the other end of said child-supporting means for maintaining the body in a normally generally horizontal position and to permit the body to rock about the said pivotal support as a child supported by the body bounces or otherwise moves up and down on the body.

2. A toy as claimed in claim 1 including means for varying the resistance of the spring means to the said rocking movement of the body.

3. A toy as claimed in claim 2 wherein the said spring means comprises tension springs connected between the upper end of the stand and the body, and the said resistance varying means comprises means for varying the tension of the said tension springs.

4. A toy of the type which is rocked by a child supported thereon, comprising a hollow body for supporting a child and including child-supporting means positioned substantially centrally lengthwise thereof, an aperture in the underside of said hollow body, an upwardly extending stand, a lower floor-engaging end portion to said stand, an upper body-supporting end portion to said stand, the said upper end portion extending through the said aperture into the interior of the hollow body, and means pivotally supporting the said body on said upper end portion for rocking about a substantially horizontal axis, said pivotal supporting means engaging the body at a point displaced longitudinally in one direction from the centre of the body, and a tension spring connecting said upper end portion to said body at a point displaced longitudinally in the other direction from the centre of the body for maintaining the body in a normally generally horizontal position.

5. A toy as claimed in claim 4 wherein the said stand comprises a triangular structure formed by two inclined upwardly convergent leg members, means securing the leg members together at their upper ends, transversely extending floor-engaging members, secured to the lower ends of the respective leg members; and a tie member connecting the said lower ends, the said structure further including means at the upper end of one leg member constituting said means for pivotally supporting the body and means on said one leg member, longitudinally spaced from said pivotal supporting means, for engaging one end of the said tension spring.

6. A toy as claimed in claim 5 wherein the said spring engaging means comprises an arm pivoted at one end to the said one leg member and having means at its other end constituting said means for engaging the said one end of the spring, and means for angularly adjusting the said arm with respect to the said one leg member thereby to vary the tension of the spring.

7. A toy as claimed in claim 5 wherein the said leg members are detachably secured together at their upper ends and the said tie member removably engages the lower ends of the leg members.

8. A toy of the type which is rocked by a child supported thereon, comprising a hollow body for supporting a child, an aperture in the underside of said hollow body, an upwardly extending stand, a lower floor-engaging end portion to said stand, an upper body-supporting end portion to said stand, the said upper end portion extending through the said aperture into the interior of the hollow body, and means pivotally supporting said body on said upper end portion for rocking about a substantially horizontal axis, said pivotal supporting means engaging the body at a point displaced longitudinally in one direction from the centre of the body, a tension spring connecting said upper end portion to said body at a point displaced longitudinally in the other direction from the centre of the body for maintaining the body in a normally generally horizontal position, and in which the said stand comprises a structure formed by a pair of spaced laterally extending floor-engaging members, a pair of upwardly extending leg members secured at their lower ends respectively to the said floor-engaging-members, a longitudinally extending frame member joining the upper ends of said leg members, means at one end of said longitudinal frame member constituting said means for pivotally supporting the body, and said connection of the spring being effected by means including means at the other end of said longitudinal frame member for connection to one end of the said tension spring.

9. A toy as claimed in claim 8 wherein the said spring connection means comprises a member adjustable lengthwise of said longitudinally extending frame member for varying the tension of the spring.

10. A toy as claimed in claim 8 including means detachably securing the said leg members to the longitudinal frame member.

References Cited in the file of this patent

UNITED STATES PATENTS

| | | |
|---|---|---|
| 60,336 | Brown | Dec. 11, 1866 |
| 1,527,015 | Sedlacek | Feb. 17, 1925 |
| 1,743,819 | Judick | Jan. 14, 1930 |
| 1,961,796 | Shuster | June 5, 1934 |
| 2,469,263 | Fisher | May 3, 1949 |